United States Patent
Fraisse et al.

(10) Patent No.: US 7,335,428 B2
(45) Date of Patent: *Feb. 26, 2008

(54) COOKING VESSEL COMPRISING A BASE MADE OF A MULTILAYER MATERIAL AND A SIDE WALL, AND ARTICLE OF MULTILAYER MATERIAL

(75) Inventors: Hervé Fraisse, Nevers (FR); Yves Grosbety, Noisy le Grand (FR); Thierry Waeckerle, Nevers (FR); Markus Spring, Eschlikon (CH); Norbert Hoffstaedter, Meerbusch (DE)

(73) Assignees: Imphy Alloys, Puteaux (FR); Alinox AG, Eschlikon, Süisse ( * ) Notice: Subject to any disclaimer, the term of this patent is extended or adjusted under 35 U.S.C. 154(b) by 134 days.

This patent is subject to a terminal disclaimer.

(21) Appl. No.: 10/497,010

(22) PCT Filed: Nov. 30, 2001

(86) PCT No.: PCT/EP01/13990

§ 371 (c)(1),
(2), (4) Date: Sep. 29, 2004

(87) PCT Pub. No.: WO03/045208

PCT Pub. Date: Jun. 5, 2003

(65) Prior Publication Data

US 2005/0064219 A1    Mar. 24, 2005

(51) Int. Cl.
*A47J 36/02* (2006.01)
*H05B 6/12* (2006.01)
*C22C 19/05* (2006.01)
*C22C 38/40* (2006.01)
*B32B 15/18* (2006.01)

(52) U.S. Cl. .................. 428/675; 428/677; 428/679; 428/680; 428/685; 220/573.1; 420/56; 420/452

(58) Field of Classification Search .................. None
See application file for complete search history.

(56) References Cited

U.S. PATENT DOCUMENTS

| | | | | |
|---|---|---|---|---|
| 2,053,096 | A * | 9/1936 | Wise et al. | 220/573.1 |
| 2,524,263 | A * | 10/1950 | Kingston | 428/675 |
| 3,505,028 | A * | 4/1970 | Douthit | 428/652 |
| 4,564,001 | A * | 1/1986 | Maeda | 219/621 |
| 4,646,935 | A * | 3/1987 | Ulam | 220/573.1 |
| 4,705,727 | A * | 11/1987 | Hunter | 428/653 |
| 4,994,903 | A * | 2/1991 | Wroe et al. | 257/720 |
| 5,064,055 | A * | 11/1991 | Bessenbach et al. | 220/626 |
| 5,952,112 | A * | 9/1999 | Spring | 428/653 |
| 6,214,401 | B1 | 4/2001 | Grosbety et al. | |
| 2006/0096670 | A1* | 5/2006 | Waeckerle et al. | 148/310 |
| 2006/0192181 | A1* | 8/2006 | Fraisse et al. | 252/500 |

FOREIGN PATENT DOCUMENTS

FR    2 453 627         11/1980
FR    2 689 748 A1     10/1993

OTHER PUBLICATIONS

Metal Progress, 1978 Databook, "Incoloy 901", 3 pages.*

* cited by examiner

*Primary Examiner*—John J. Zimmerman
(74) *Attorney, Agent, or Firm*—Sughrue Mion, PLLC

(57) ABSTRACT

The invention relates to a cooking vessel comprising a base made of a multilayer material and a side wall, the said multilayer material comprising, in succession from the outside of the vessel to the inside of the vessel: an outer part, having a thickness $e_E$, consisting of a layer of a ferromagnetic Nickel based alloy having a Curie temperature of between 30 and 350° C. and a thermal expansion coefficient of greater than or equal to $6.5 \cdot 10^{-6}$ K$^{-1}$, and a core, having a thickness $e_c$, comprising at least one layer selected among aluminium, aluminium alloy and copper.

17 Claims, No Drawings

COOKING VESSEL COMPRISING A BASE MADE OF A MULTILAYER MATERIAL AND A SIDE WALL, AND ARTICLE OF MULTILAYER MATERIAL

BACKGROUND OF THE INVENTION

The present invention relates to a cooking vessel comprising a bottom made of a multilayer material and a side wall and to an article of multilayer material, the said vessel being more particularly intended for cooking food by induction.

The cooking of food by induction is carried out by means of an inductor generally placed beneath a glass-ceramic plate which is transparent to electromagnetic fields, on which the cooking vessel whose contents it is desired to heat is placed. The flow of the high-frequency current in the inductor creates a magnetic field inducing eddy currents in the vessel which therefore heats up by the Joule effect.

There are also specific appliances for cooking without glass-ceramic plates, for which the materials, forming the subject of this patent, should allow the manufacture of vessels.

To achieve a high energy efficiency, the metal bases used for these vessels have a high electrical conductivity and a high amplification of the magnetic field at the operating frequencies used, which are between 20 and 50 kHz. An alloy which is ferromagnetic in the working temperature range of the vessel is therefore generally used.

These vessels must have a high corrosion resistance for the face in contact with the food, but also to a lesser extent for this base which must not deteriorate with washing.

They must also be mechanically stable so that the vessel retains its geometry, in particular the flatness of the base in contact with the top of the inductor. In fact, when a vessel is heated, its base tends to expand. The side wall of the vessel, also called the skirt, is raised to a lower temperature than the base and therefore expands less, thereby exerting a radial compressive force on this base. The latter can then expand only by bowing, thereby reducing the energy efficiency of the assembly and making it less pleasant for the user because of the noise and the annoyance that it causes. This effect is reversible the first few times the vessel is used, but may result in irreversible degradation after a large number of these thermal cycles by structural transformation of the materials of the base. This phenomenon is particularly sensitive when only the base of the vessel contains a highly conducting material (aluminium or copper, for example).

In the case of multilayer materials, the various layers of which generally have very different expansion coefficients, this difference in coefficient introduces a bimetallic strip effect tending both to deform the base of the container and to the make adhesion of the various layers deteriorate irreversibly towards localized debonding, and therefore a significant loss of efficiency of the vessel, in the case of induction hetaing as well as by any other heating process (IR, halogen, etc. . . . )

To produce these vessels, it is common practice to use, for the ferromagnetic part, ferritic stainless steels such as 17% Cr—Fe or three-layer symmetrical materials, namely austenitic stainless steel/ferritic stainless steel/austenitic stainless steel. These materials have the drawback of having a Curie temperature above 600° C., which means that the bases of these vessels may themselves also reach this temperature, which may result in the loss and burning of food and the degradation of the vessel, this being so, even well below this temperature of 600° C.

To remedy this problem, it has been proposed in FR 2 453 627 to manufacture a vessel base from a three-layer material comprising an alloy whose Curie point is between 60 and 200° C. As long as the temperature of the vessel is below the Curie point, the alloy is ferromagnetic and can generate losses by induced currents, thereby heating the vessel. As soon as the temperature of the vessel exceeds the Curie point, the alloy is no longer ferromagnetic and the heating stops, resuming again only when the temperature of the vessel drops below the Curie point. Thus, thermal regulation of the vessel is therefore obtained. However, such a material is not suitable for cooking or for frying food, which needs to be able to reach temperatures ranging from 220 to 320° C. In addition, nothing was proposed in that patent to ensure good geometrical stability of the vessel and good corrosion resistance of both faces of the vessel.

The same principle is adopted in FR 2 689 748, in which it is proposed to manufacture vessels from a three-layer material comprising an alloy such as 64Fe-36Ni, the Curie point of which is 250° C. However, this type of alloy has a very mediocre corrosion resistance and a very low expansion coefficient. Yet this alloy is pressed against a metal layer having a markedly higher expansion coefficient, which results in deformation of the base of the container owing to the bimetallic strip effect when it is heated, which deformation may sometimes become irreversible. Furthermore, degradation in the bonding between the layers may also be observed, this being due to the phenomenon of creep under a cyclic stress and temperature.

SUMMARY OF THE INVENTION

The object of the invention is therefore to provide cooking vessels having a multilayer base that does not deform either over time or during operation, the layers of which remain bonded together and the corrosion resistance of which is good on both faces, the said vessel furthermore having to allow food to be cooked or fried at a temperature automatically regulated by the vessel itself, thus avoiding any risk of the vessel being accidentally overheated.

DETAILED DESCRIPTION OF THE INVENTION

For this purpose, the first subject of the invention is a cooking vessel comprising a base made of a multilayer material and a side wall, the said multilayer material comprising, in succession from the outside of the vessel to the inside of the vessel:

an outer part, having a thickness $e_E$, consisting of a layer of a ferromagnetic alloy having a Curie temperature of between 30 and 350° C. and a thermal expansion coefficient of greater than or equal to $6.5 \cdot 10^{-6} \text{ K}^{-1}$, the chemical composition of which comprises, in percent by weight:

$32.5\% \leq Ni \leq 72.5\%$ $5\% \leq Cr \leq 18\%$ $0.1\% \leq Mn \leq 0.5\%$ $C \leq 1\%$ optionally one or more elements chosen from Mo, V, Co, Cu, Si, W, Nb and Al, the sum of the contents of these elements being less than or equal to 10%, the balance being iron and impurities resulting from the smelting, the chemical composition furthermore satisfying the following relationships:

$$Cr-1.1Ni+23.25 \leq 0\%$$

$$45Cr+11Ni \leq 1360$$

$$Ni+3Cr \geq 60\% \text{ if } Ni \geq 37.5$$

$$Cr \geq 7.5 \text{ if } Ni \leq 37.5$$

the said layer of ferromagnetic alloy optionally being inserted between two layers of austenitic stainless steel, then
   a core, having a thickness $e_c$, comprising at least one layer selected among aluminium, aluminium alloy and copper, and
   optionally an inner part having a thermal expansion coefficient of greater than or equal to $6.5 \cdot 10^{-6}$ K$^{-1}$ and possibly being covered with a non-stick or anticorrosion coating.

The present inventors have in fact found that such a vessel exhibits, in particular, excellent mechanical, geometrical and dimensional stability over time and during operation, the base of the vessel remaining flat during heating. In a preferred embodiment, the base and the side wall of the vessel are made of the same multilayer material.

In another preferred embodiment, the multilayer material does not comprise any inner part and $e_C/e_E = 6$, and more preferably $e_C/e_E = 10$.

In another preferred embodiment, the inner part consists of a layer of ferritic stainless steel whose thermal expansion coefficient is between $9 \cdot 10^{-6}$ K$^{-1}$ and $14 \cdot 10^{-6}$ K$^{-1}$, optionally inserted between two layers of austenitic stainless steel, it being particularly preferable for the chemical composition of the said ferritic stainless steel to comprise, in percent by weight:

$$12\% \leq Cr \leq 25\%$$

$$C \leq 0.03\%$$

$$Si \leq 0.5\%$$

$$0.1\% \leq Mn \leq 0.5\%$$

$$Al \leq 0.5\%$$

$$Ti \leq 1\%$$

$$Mo \leq 2\%$$

$$V \leq 2\%$$

the balance being iron and impurities resulting from the smelting.

In another preferred embodiment, the multilayer material of the vessel comprises an inner part consisting of a layer of ferromagnetic alloy having a Curie temperature of between 30 and 350° C., optionally inserted between two layers of austenitic stainless steel, it being particularly preferable for the chemical composition of the said ferromagnetic alloy steel to comprise, in percent by weight:

$$32.5\% \leq Ni \leq 72.5\%$$

$$5\% \leq Cr \leq 18\%$$

$$0.1\% \leq Mn \leq 0.5\%$$

$$C \leq 1\%$$

optionally one or more elements chosen from Mo, V, Co, Cu, Si, W, Nb and Al, the sum of the contents of these elements being less than or equal to 10%, the balance being iron and impurities resulting from the smelting, the chemical composition furthermore satisfying the following relationships:

$$Cr-1.1Ni+23.25 \leq 0\%$$

$$45Cr+11Ni \leq 1360$$

$$Ni+3Cr \geq 60\% \text{ if } Ni \geq 37.5$$

$$Cr \geq 7.5 \text{ if } Ni \leq 37.5$$

The second subject of the invention is an article made of the multilayer material (constituting the cooking vessel) which has just been described, and in the same preferred embodiments.

The present invention will now be illustrated by the detailed description of the three embodiments given by way of non-limiting examples.

The first embodiment relates to a cooking vessel intended for cooking or frying food, such as rice, fish or meat. For this type of food, the optimum cooking temperature is between 220 and 290° C. The outer part of the multilayer material, which will be in contact with the inductor, is therefore chosen to consist of a layer of Fe—Ni—Cr ferromagnetic alloy containing from 47 to 55%, preferably 48 to 50%, nickel and from 7 to 13%, preferably from 7 to 10%, chromium, with optionally up to 8% cobalt and/or copper. This layer has a Curie temperature of between 220 and 290° C. and a thermal expansion coefficient close to $10 \cdot 10^{-6}$ K$^{-1}$.

The core of the multilayer material comprises at least one layer selected among aluminium, aluminium alloy and copper. One of the main function of this core is to diffuse heat uniformously in the vessel.

By example, this core may consist of three aluminium or aluminium alloy layers. It will be preferred to have a central layer thicker and less rich in aluminium than the other two layers. Either very pure aluminium or an aluminium alloy of the AA 3003 or AA 3004 type may be chosen. The thermal expansion coefficient of this particular triple layer is greater than $22 \cdot 10^{-6}$ K$^{-1}$.

Another example of core may consist in a copper layer optionally inserted between two aluminium or aluminium alloy layers.

To improve the mechanical and geometrical stability of the vessel further, an inner part, made for example of an Fe—Cr—Ti ferritic stainless steel alloy containing 16 to 21% chromium and 0.4 to 0.6% titanium is added; it is also possible to use an Fe—Cr—Mo ferritic stainless steel alloy containing 16 to 21% chromium, 0.6 to 1.5% molybdenum and 0.3 to 0.7% niobium. The Curie temperature of the alloy used is above that of the Fe—Ni—Cr alloy of the outer part and is above 400° C. Its thermal expansion coefficient is here between $10 \cdot 10^{-6}$ K$^{-1}$ and $14 \cdot 10^{-6}$ K$^{-1}$.

The use of such a layer with a high Curie point as the inner part of the vessel produces little heat when the temperature exceeds the Curie point of the outer layer and therefore does not disturb the temperature regulation of the vessel.

The second embodiment relates to a cooking vessel intended for cooking food such as vegetables or fruit.

For this type of food, the optimum cooking temperature is between 110 and 160° C. The outer part of the multilayer material, which will be in contact with the inductor, is therefore chosen to consist of a layer of a ferromagnetic Fe—Ni—Cr alloy containing from 44 to 47% nickel and from 12 to 15% chromium, the Curie temperature of which is between 140 and 160° C. Its thermal expansion coefficient is close to $9.5 \cdot 10^{-6}$ $K^{-1}$.

The core of the multilayer material comprises at least one layer selected among aluminium, aluminium alloy and copper.

The vessel also comprises an inner part consisting of an Fe—Cr—Ti ferritic stainless steel alloy containing 19 to 21% chromium and 0.4 to 0.6% titanium, the Curie temperature of which is above that of the Fe—Ni—Cr alloy of the outer part and the thermal expansion coefficient of which is close to $11.5 \cdot 10^{-6}$ $K^{-1}$.

The third embodiment relates to a cooking vessel intended for cooking or keeping warm food such as meat or fish. For this type of food, the optimum cooking temperature is between 100 and 260° C. The outer part of the multilayer material, which will be in contact with the inductor, is therefore chosen to consist of a layer of a ferromagnetic Fe—Ni—Cr alloy containing from 47.5 to 60%, preferably from 48 to 50%, nickel and from 9 to 15% chromium, with optionally up to 8% cobalt and/or copper. The Curie temperature of this layer is between 100 and 260° C. Its thermal expansion coefficient is between $9 \cdot 10^{-6}$ $K^{-1}$ and $11 \cdot 10^{-6}$ $K^{-1}$. The thickness of the outer part $e_E$ is between 0.15 and 1.5 mm.

The vessel does not comprise any inner part, but the core of the multilayer material comprises at least one layer selected among aluminium, aluminium alloy and copper, the thickness of which is between 1 and 9 mm.

To further increase the mechanical and geometrical stability of the vessel, the thickness of the aluminium core may be increased.

The vessels described in these three embodiments are very stable mechanically and geometrically over time and also have a base which remains flat during heating, thereby making it possible to optimize the energy consumption and to cook the food uniformly. They have good corrosion resistance on both their faces. Finally, these three embodiments have the important property of automatically regulating their temperature about a value assigned by the application.

The invention claimed is:

1. A cooking vessel comprising a base made of a multilayer material and a side wall, said multilayer material comprising, in succession from the outside of the vessel to the inside of the vessel:

an outer part, having a thickness $e_E$, consisting of a layer of a ferromagnetic alloy having a Curie temperature of between 30 and 350° C. and a thermal expansion coefficient of greater than or equal to $6.5 \cdot 10^{-6}$ $K^{-1}$, the chemical composition of which comprises, in percent by weight:

$32.5\% \leq Ni \leq 72.5\%$ $5\% \leq Cr \leq 18\%$ $0.1\% \leq Mn \leq 0.5\%$ $C \leq 1\%$ optionally one or more elements chosen from Mo, V, Co, Cu, Si, W, Nb, and Al, the sum of the contents of these elements being less than or equal to 10%, the balance being iron and impurities resulting from the smelting, the chemical composition furthermore satisfying the following relationships:

$Cr - 1.1Ni + 23.25 \leq 0\%$ $45Cr + 11Ni \leq 1360$ $Ni + 3Cr \geq 60\%$ if $Ni \geq 37.5$ $Cr \geq 7.5$ if $Ni \leq 37.5$ said layer of ferromagnetic alloy optionally being inserted between two layers of austenitic stainless steel, then a core, having a thickness $e_c$, comprising at least one layer selected among aluminium, aluminium alloy and copper, and optionally an inner part having a thermal expansion coefficient of greater than or equal to $6.5 \cdot 10^6$ $K^{-1}$ and possibly being covered with a non-stick or anticorrosion coating.

2. Cooking vessel according to claim 1, characterized in that the multilayer material does not comprise any inner part and $e_c/e_E = 6$.

3. Cooking vessel according to claim 1, characterized in that said multilayer material comprise an inner part consisting of a layer of ferritic stainless steel whose thermal expansion coefficient is between $9 \cdot 10^{-6}$ $K^{-1}$ and $14 \cdot 10^{-6}$ $K^{-1}$, optionally inserted between two layers of austenitic stainless steel.

4. Cooking vessel according to claim 3, characterized in that the inner part consists of a layer of ferritic stainless steel, optionally inserted between two layers of austenitic stainless steel, and in that the chemical composition of said ferritic stainless steel comprises, in percent by weight:

$12\% \leq Cr \leq 25\%$ $C \leq 0.03\%$ $Si \leq 0.5\%$ $0.1\% \leq Mn \leq 0.5\%$ $Al \leq 0.5\%$ $Ti \leq 1\%$ $Mo \leq 2\%$ $V \leq 2\%$ $Nb \leq 1\%$ the balance being iron and impurities resulting from the smelting.

5. Cooking vessel according to claim 1, characterized in that said multilayer material comprises an inner part consisting of a layer of ferromagnetic alloy having a Curie temperature of between 30 and 350° C., optionally inserted between two layers of austenitic stainless steel.

6. Cooking vessel according to claim 5, characterized in that said inner part consists of a layer of ferromagnetic alloy, optionally inserted between two layers of austenitic stainless steel, and in that the chemical composition of said ferromagnetic alloy comprises, in percent by weight:

$32.5\% \leq Ni \leq 72.5\%$ $5\% \leq Cr \leq 18\%$ $0.1\% \leq Mn \leq 0.5\%$ $C \leq 1\%$ optionally one or more elements chosen from Mo, V, Co, Cu, Si, W, Nb and Al, the sum of the contents of these elements being less than or equal to 10%, the balance being iron and impurities resulting from the smelting, the chemical composition furthermore satisfying the following relationships:

$Cr-1.1Ni+23.25 \leq 0\%$ $45Cr+11Ni \leq 1360$ $Ni+3Cr \geq 60\%$ if $Ni \geq 37.5$ $Cr \geq 7.5$ if $Ni \leq 37.5$ 7. Cooking vessel according to any one of claims 3 or 4, intended for cooking or frying food, such as rice, fish or meat, characterized in that said outer part consists of a layer of ferromagnetic alloy containing from 47 to 55% nickel, from 7 to 13% chromium and from 0 to 8% cobalt and/or of copper, the Curie temperature of which is between 220 and 290° C., and in that it comprises an inner part consisting of a ferritic stainless steel alloy containing 16 to 21% chromium and 0.4 to 0.6% titanium, or of a ferritic stainless steel alloy containing 16 to 21% chromium, 0.6 to 1.5% molybdenum and 0.3 to 0.7% niobium, said inner part having a Curie temperature above that of the ferromagnetic alloy of the outer part and a thermal expansion coefficient of between $10 \cdot 10^{-6}$ $K^{-1}$ and $14 \cdot 10^{-6}$ $K^{-1}$, the core comprising at least one layer selected among aluminium, aluminium alloy and copper.

8. Cooking vessel according to any one of claims 3 or 4, intended for cooking food such as vegetables or fruit, characterized in that said outer part consists of a layer of ferromagnetic alloy containing from 44 to 47% nickel and from 12 to 15% chromium, the Curie temperature of which is between 110 and 160° C., and in that it comprises an inner part consisting of a ferritic stainless steel alloy containing 19 to 21% chromium and 0.4 to 0.6% titanium, the Curie temperature of which is above that of the ferromagnetic alloy of the outer part, the core comprising at least one layer selected among aluminium, aluminium alloy and copper.

9. Cooking vessel according to claim 2 intended for cooking or keeping warm food, such as fish or meat, characterized in that said outer part consists of a layer of ferromagnetic alloy containing from 47,5 to 60% nickel, from 9 to 15% chromium and from 0 to 8% cobalt and/or of copper, the Curie temperature of which is between 100 and 260° C., and the thickness $e_E$ of which is between 0.15 and 1.5 mm, and in that it comprises a core comprising at least one layer selected among aluminium, aluminium alloy and copper, the thickness of which is between 1 and 9 mm.

10. Vessel according to any one of claims 1 to 6 and 9, characterized in that the side wall of said vessel is made from the same multilayer material as the base of the said vessel.

11. An article made of multilayer material comprising:

a first outer layer, consisting of a layer of a ferromagnetic alloy having a Curie temperature of between 30 and 350° C. and a thermal expansion coefficient of greater than or equal to $6.5 \cdot 10^{-6}$ $K^{-1}$, the chemical composition of which comprises, in percent by weight:

$32.5\% \leq Ni \leq 72.5\%$ $5\% \leq Cr \leq 18\%$ $0.1\% \leq Mn \leq 0.5\%$ $C \leq 1\%$ optionally one or more elements chosen from Mo, V, Co, Cu, Si, W, Nb and Al, the sum of the contents of these elements being less than or equal to 10%, the balance being iron and impurities resulting from the smelting, the chemical composition furthermore satisfying the following relationships:

$Cr-1.1Ni+23.25 \leq 0\%$ $45Cr+11Ni \leq 1360$ $Ni+3Cr \geq 60\%$ if $Ni \geq 37.5$ $Cr \geq 7.5$ if $Ni \leq 37.5$ said layer optionally being inserted between two layers of austenitic stainless steel, then a core comprising at least one layer selected among aluminium, aluminium alloy and copper, and optionally a second outer layer, on the opposite face to the first outer layer, having a thermal expansion coefficient of greater than or equal to $6.5 \cdot 10^{-6}$ $K^{-1}$ and possibly being covered with a non-stick or anticorrosion coating.

12. Article according to claim 11, characterized in that the second outer layer consists of a layer of ferritic stainless steel, the thermal expansion coefficient of which is less than $14 \cdot 10^{-6}$ $K^{-1}$, optionally inserted between two layers of austenitic stainless steel.

13. Article according to claim 12, characterized in that the second outer layer consists of a layer of ferritic stainless steel, optionally inserted between two layers of austenitic stainless steel, and in that the chemical composition of the said ferritic stainless steel comprises, in percent by weight:

$12\% \leq Cr \leq 25\%$ $C \leq 0.03\%$ $Si \leq 0.5\%$ $0.1\% \leq Mn \leq 0.5\%$ $Al \leq 0.5\%$ $Ti \leq 1\%$ $Mo \leq 2\%$ $V \leq 2\%$ $Nb \leq 1$ the balance being iron and impurities resulting from the smelting.

14. Article according to claim 11, characterized in that it comprises a second outer layer consisting of a layer of ferromagnetic alloy having a Curie temperature of between 30 and 350° C., optionally inserted between two layers of austenitic stainless steel.

15. Article according to claim 14, characterized in that the second outer layer consists of a layer of a ferromagnetic alloy, optionally inserted between two layers of austenitic stainless steel, and in that the chemical composition of said alloy comprises, in percent by weight:

$32.5\% \leq Ni \leq 72.5\%$ $5\% \leq Cr \leq 18\%$ $0.1\% \leq Mn \leq 0.5\%$ $C \leq 1\%$ optionally one or more elements chosen from Mo, V. Co, Cu, Si, W, Nb and Al, the sum of the contents of these elements being less than or equal to 10%, the balance being iron and impurities resulting from the smelting, the chemical composition furthermore satisfying the following relationships:

$Cr-1.1Ni+23.25 \leq 0\%$ $45Cr+11Ni \leq 1360$ $Ni+3Cr \geq 60\%$ if $Ni \geq 37.5$ $Cr \geq 7.5$ if $Ni \leq 37.5$

16. Vessel according to claim 7, characterized in that the side wall of said vessel is made from the same multilayer material as the base of the said vessel.

17. Vessel according to claim 8, characterized in that the side wall of said vessel is made from the same multilayer material as the base of the said vessel.

* * * * *